July 26, 1949.  C. DE LANGE  2,477,364
BLOCKING-LAYER RECTIFIER
Filed Sept. 20, 1945  2 Sheets-Sheet 1
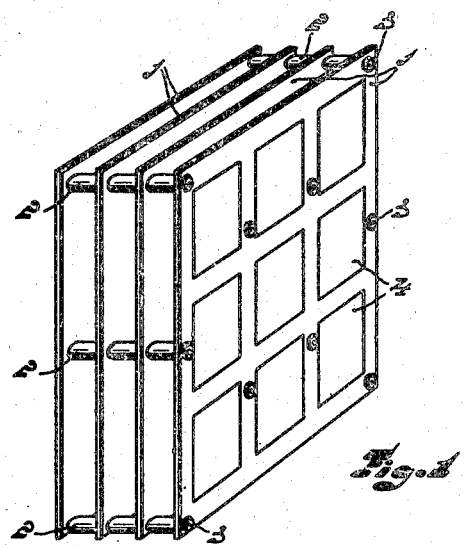
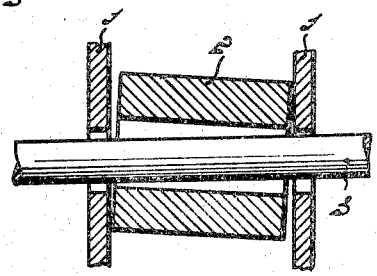
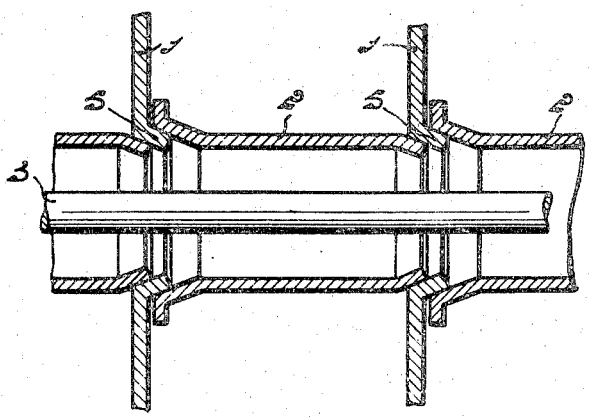
INVENTOR
CORNELIS DE LANGE
BY
ATTORNEY

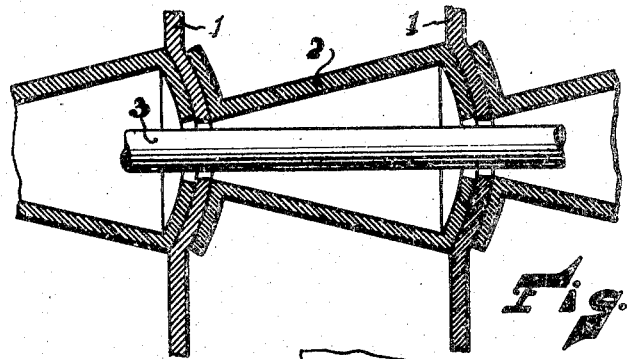
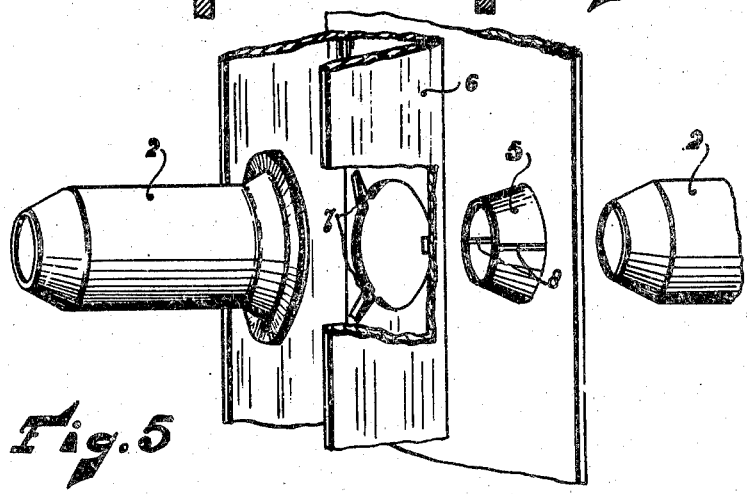
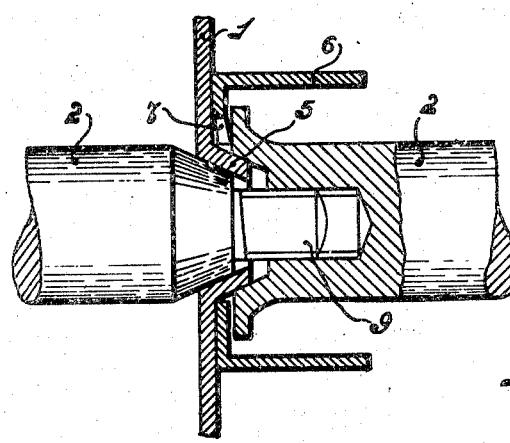

UNITED STATES PATENT OFFICE 2,477,364

BLOCKING-LAYER RECTIFIER

Cornelis de Lange, Eindhoven, Netherlands, assignor to Hartford National Bank & Trust Co., Hartford, Conn., as trustee Application September 20, 1945, Serial No. 617,581
In the Netherlands November 21, 1942

Section 1, Public Law 690, August 8, 1946
Patent expires November 21, 1962

12 Claims. (Cl. 175—366)

It may be assumed to be commonly known that the properties of blocking-layer rectifiers depend on the time for which they have been operated; this phenomenon is usually called "aging." In circuit arrangements comprising only a few rectifier plates the consequences of this aging usually consist only in that the internal resistance increases and the efficiency falls off. In circuits, however, where several plates are connected in series or in parallel, these consequences are graver. They will be discussed by giving an example, for which a selenium rectifier has been chosen.

In the case of a selenium rectifier having a certain number of plates connected in parallel the resistance of these plates will naturally vary somewhat. The plate having the lowest resistance will convey the strongest current and become hottest. Owing to the negative temperature coefficient of the resistance of the semiconductor, this resistance will decrease still more. However, there is a fact by which this disturbance of the equilibrium is counteracted in the end, at least if this disturbance of the equilibrium has not led directly to deterioration of the plate bearing the highest load. Due to formation during operation the hottest plate will exhibit a greater increase of the internal resistance than the cooler plates. This may be imagined by assuming the blocking-layer to be strengthened, and in this case the aging does not affect the equilibrium. Yet it is desirable in order to avoid damaging at the beginning of the operation, that the rectifier should be built up of substantially uniform plates.

In the case of a selenium rectifier comprising a certain number of series-connected plates, the plate having the highest resistance will become hottest. Due to the decrease in resistance owing to the negative temperature coefficient a compensation will occur, it is true, but this cannot prevent this plate from receiving a higher voltage than the other plates. As a result of the formation occurring during operation the resistance will increase and often to such a degree that the voltage on the plate acquires such a value in the blocking direction as to involve a break-down. In this case, also, the plates should be carefully chosen before assembling the rectifier.

It will be obvious that both in rectifiers comprising plates in parallel-connection and in those comprising plates in series-connection it is desirable for a stable operation that the thermal resistance between the various plates should be so low that these acquire substantially equal temperatures, even if the quantity of heat produced in a plate is larger than that produced in another plate. The heat evolved in the plates having the highest load will then spread over the plates having a smaller load. This condition can be readily satisfied in small rectifiers comprising plates that are slipped on one or more rods with the interposition of rings. In the case of a large rectifier, however, where the plates have a large surface and the distance between the plates is also large, simple distance pieces prove unsatisfactory. Unless the distance pieces be given an undue large diameter the distance pieces are likely to tip, thus causing a bad thermal contact between the plates.

It is to be noted that the term plates used throughout the description is to be understood to include rectifying plates furnished with semiconductive and well-conductive layers, and in addition cooling plates. Of course, the same condition of a good thermal contact holds in regard to the cooling plates which are steadily in intimate thermal contact with the rectifying plates and even carry them in various constructions, so that they practically form an assembly with the rectifying plates.

Consequently the invention relates to a blocking-layer rectifier in which several parallel plates are pressed together with the interposition of distance pieces.

According to the invention the plates and the distance pieces are so formed that the contact surface of both of them forms an angle with the plane of the plates which is larger than the friction angle between plate and distance piece.

In this construction it is achieved that the distance piece, when being pressed against the plate, is capable of shifting along the contact surface which permits a perfect fit to be established. In this case the distance between the plates will be slightly altered but this is not objectionable. Generally the angle should exceed 5° in order to satisfy the condition imposed.

In a suitable form of construction the plate is furnished with apertures having rims whose surface forms part of the surface of a cone, whose axis is normal to the plane of the plates and which constitutes the plane of contact with the distance piece.

In another form of construction the surface of these rims forms part of a spherical surface.

These two forms have the advantage of a perfect fit being obtained automatically.

In a further form of construction both sides of the rims constitute a contact surface with two distance pieces located on either side of the plate.

which permits the plates with their rims and the distance pieces to be telescoped, as it were.

A suitable form for the distance pieces is that of a piece of tube whose edges are deformed in such a manner as to form end faces forming part of a conical or spherical surface whose axis coincides with that of the piece of tube.

A simple construction can be obtained when the surface of one end and the inner surface of the other end of the distance pieces are shaped as part of the surface of a cone or sphere whose axis coincides with that of the distance piece. When assembling the distance pieces thus formed with the interposition of plates, a simple deformation of the plates makes the latter contact with the distance pieces on both sides.

For a closer fit it may be desirable that the parts of a plate and/or a distance piece forming the contact surfaces should be furnished with incisions.

Between the plates and the distance pieces other plate-shaped parts of the rectifier may be clamped with the interposition of a spring element. For example, cooling rails or current collectors may be secured in this way. The spring element may consist of tags bent out of these plate-shaped parts.

A rectifier built according to the foresaid principle comprising plates which carry the rectifying plates that consist of a supporting plate carrying a semi-conductive layer, lends itself eminently to the rectification of alternating current having a low voltage with more than one phase, when all supporting plates receiving the same potential are brought into intimate thermal contact.

The invention will be more fully explained by reference to the accompanying drawing representing examples of a common construction and of constructions according to the invention.

Fig. 1 shows a blocking-layer rectifier in which several parallel cooling plates are pressed together with the interposition of distance pieces.

Fig. 2 is a section of a common distance piece.

Fig. 3 illustrates one embodiment of the invention in which a separator having conical tapered end portions separates two plates of a rectifying cell.

Fig. 4 illustrates another embodiment of the invention in which the separator having spherical portions at its extremities is arranged to separate two plates of a rectifying cell.

Fig. 5 illustrates a cooling rail which is clamped to one plate of the cell and held in place with a separator.

Fig. 6 illustrates a spacer having a journalled construction for separating the plates of a rectifier cell in securely spaced relationship.

The rectifier shown in Fig. 1 consists of several cooling plates 1 that are spaced apart by means of tubes 2 and are pressed together by means of drawbolts 3. It is necessary to space these plates apart from each other to permit the circulation of air between them. Furthermore this distance may be required in connection with cooling ribs provided on the back of the plates. Each cooling plate 1 carries nine rectifying plates 4 which are secured to the cooling plates by means of rivets.

A suitable distance piece is shown in cross-section in Fig. 2. The consequences resulting from a wrong position of the distance piece between the plates are exaggerated in this figure. Apparently this construction would ensure a suitable heat transfer, but it has been found in practice that notwithstanding accurate finishing of plates and distance pieces temperature jumps up to 5° C. may occur from plate to plate.

Fig. 3 represents a construction according to the invention, in which the plates 1 are provided with rims 5 along the periphery of the apertures through which are slipped the drawbolts 3. Between the plates are provided distance pieces 2 by which the rims are either surrounded telescopically or which are slipped telescopically into the apertures. This construction ensures such a good thermal contact that the temperature jump from plate to plate does not exceed 1° C. In this construction the distance pieces are tubular; they may, for instance, be made by extrusion from aluminium.

Fig. 4 shows another embodiment of the invention, in which the contact surfaces form part of a sphere. In this construction the thermal contact, supposing the force in the drawbolt 3 being the same, will be less intimate than in the construction shown in Fig. 3. However, this construction has the advantage of a slight rotation of the distance pieces 2 being less detrimental.

Fig. 5 shows as an example of another part of the rectifier, which may be clamped under the distance pieces, a cooling rail 6, which is furnished with an aperture corresponding to the outer periphery of the rim stamped from the plate 1. Consequently, this rim prevents shifting of the rail after assemblage of the whole. The rail and plate are pressed together by means of the distance pieces 2. It is clear that, unless special precautions be taken, either the rail is not entirely clamped, or the tube 2 does not embrace the edge 5, so that in this case the transfer of heat will be unsatisfactory. In order to avoid this drawback a spring element is provided in between. To such end tags 7 bent out of the rail may preferably be used. As an alternative a spring ring may be used.

This figure also shows how the edges stamped from the plate can be provided with incisions 8. These render the edges elastic so that they fit conveniently between the distance pieces.

In Fig. 6 distance pieces 2 are used which are massive and screwed together; to this end one end of the distance piece is provided with a journal 9. The advantage of such a construction is that the number of plates to be assembled can always be varied without the need for drawbolts or the like of different lengths.

For rectifying alternating current having a low voltage and more than one phase use may be made of a Grätz- or bridge circuit, of a bilateral rectifying circuit with midpoint tapping on the alternating current supply or of a unilateral rectifying circuit. For example, in the case of three phases three similar electrodes are connected to each direct current terminal in the first circuit; in the second circuit six similar electrodes are connected to one terminal, in the third circuit three. When using in such a circuit a rectifier built according to the principle set out above, the supporting plates receiving the same potential can be brought into intimate thermal contact. In the case of a selenium rectifier the supporting plates constitute the negative terminal. In the circuit, called the second circuit hereinbefore, the negative terminal is thus connected to six supporting plates which are in good thermal contact with each other, whilst the other six electrodes are connected to the alternating current supply. In a cuprous oxide rectifier it is the supporting plate which constitutes the positive terminal, so that in this case the positive terminal is connected to the six supporting plates.

It will be appreciated that in discussing these circuit arrangements each electrode or supporting plate is to be understood to mean also a certain number of parallel connected electrodes or plates.

What I claim is:

1. A current rectifier cell assembly comprising a plurality of rectifier plates having spaced parallel plane portions and having portions with apertures which are aligned normal to said plane portions, and thermally conductive spacing elements having end portions bearing against said aperture portions, the abutting surfaces of said end portions and said aperture portions being defined by interlocking surfaces of revolution centered about said apertured portions.

2. A current rectifier cell assembly comprising a plurality of rectifier plates having spaced parallel plane portions and having portions with apertures which are aligned normal to said plane portions, thermally conductive spacing elements having end portions bearing against said apertured portions, the abutting surfaces of said end portions and said apertured portions being defined by interlocking surfaces of revolution centered about said apertured portions, and means for maintaining thermal contact between said rectifying plate and said spacing element.

3. A current rectifier cell assembly comprising a plurality of rectifier plates having spaced parallel plane portions and having portions with apertures which are aligned normal to said plane portions, thermally conductive spacing elements having end portions bearing against said apertured portions, the abutting surfaces of said end portions and said apertured portions being defined by interlocking conical surfaces centered about the axis of said spacing elements and passing through said aperture portions, and means for maintaining thermal contact between said rectifier plates and said spacing elements.

4. A current rectifier cell assembly comprising a plurality of rectifying plates having spaced parallel plane portions and having portions with apertures which are aligned normal to said plane portions, thermally conductive spacing elements having end portions adapted to bear against said flared portions, the abutting surfaces of said end portions and said apertured portions being defined by interlocking spherical surfaces centered about said apertured portions, and means for maintaining thermal contact between said rectifier plates and said spacing elements.

5. A current rectifier cell assembly comprising a plurality of rectifying plates having spaced parallel plane portions and having flared portions with apertures which are aligned normal to said plane portions, tubular thermally conductive spacing elements having end portions adapted to bear against said flared portions, the abutting surfaces of said end portions and said flared portions being defined by interlocking surfaces of revolution centered about said apertures, and means for maintaining thermal contact between said rectifier plates and said spacing elements.

6. A current rectifier cell assembly comprising a plurality of rectifying plates having spaced parallel plane portions and having flared portions with apertures which are aligned normal to said plane portions, tubular thermally conductive spacing elements adapted to bear against said flared portions, the abutting surfaces of said end portions and said flared portions being defined by interlocking conical surfaces centered about the axis of said tubular spacing element, and means for maintaining thermal contact between said rectifier plates and said spacing elements.

7. A current rectifier cell assembly comprising a plurality of rectifying plates having spaced parallel plane portions and having flared portions with apertures which are aligned normal to said plane portions, said apertured portions defining inner and outer surface portions, tubular thermally conductive spacing elements having end portions adapted to abut the respective inner and outer surface portions of said apertured portions, the abutting surfaces of said flared portions and said end portions being defined by interlocking surfaces of revolution centered about the axis of said spacing element, and means for maintaining thermal contact between said rectifier plates and said spacing elements.

8. A current rectifier cell assembly comprising a plurality of rectifying plates having spaced parallel plane portions and having flared portions defining apertures which are aligned normal to said plane portions, said apertured flared portions defining inner and outer surface portions, tubular thermally conductive spacing elements having tapered end portions, one of said tapered end portions adapted to abut the inner surface portion of said flared portion and the other tapered end portion adapted to abut the outer surface portion of another of said flared portions, the abutting surfaces being defined by interlocking conical surfaces centered about the axis of said tubular spacing element, and means for maintaining thermal contact between said rectifier plates and spacing elements.

9. A current rectifier cell assembly comprising a plurality of rectifying plates having spaced parallel plane portions and having spherical flared portions defining apertures which are aligned normal to said plane portions, said aperture portions defining inner and outer surface portions, tapered tubular thermally conductive spacing elements having spherical end portions, one of said spherical end portions adapted to abut the outer surface portion of said flared portion and the other of said spherical end portions adapted to abut the inner surface portion of said flared portion, the abutting surfaces being defined by concentrically arranged spherical surfaces in interlocking relationship, and means for maintaining thermal contact between said rectifying plates and said spacing elements.

10. A current rectifier cell assembly comprising a plurality of rectifier plates having spaced parallel plane portions and having portions with apertures which are aligned normal to said plane portions, thermally conductive spacing elements having end portions bearing against said aperture portions, the abutting surfaces of said end portions and said aperture portions being defined by interlocking surfaces of revolution centered about said apertured portions, plate shaped cooling rails including interlocking spring portions clamped between said spacing elements and said rectifying plates, and means for maintaining thermal contact between said rectifying plates and spacing element.

11. A current rectifier assembly comprising a plurality of rectifier plates having spaced parallel plane portions and having portions with apertures which are aligned normal to said plane portions, and thermally conductive spacing elements having securely interfitting end portions bearing against said apertured portions, the abutting surfaces of said end portions and said apertured portions being defined by interlocking surfaces of revolution centered about said apertured portions.

12. A current rectifier cell assembly comprising a plurality of rectifier plates having spaced parallel plane portions and having portions with apertures which are aligned normal to said plane portions, thermally conductive spacing elements having securely interfitting end portions bearing against said apertured portions, the abutting surfaces of said end portions and said apertured portions being defined by interlocking surfaces of revolution centered about said apertured portions, and plate shaped cooling rails including interlocking spring portions clamped between said spacing elements and said rectifying plates.

CORNELIS DE LANGE.

REFERENCES CITED

The following references are of record in the file of this patent:

UNITED STATES PATENTS

| Number | Name | Date |
|---|---|---|
| 1,801,836 | Aumann | Apr. 21, 1931 |
| 1,872,947 | Hengstenberg | Aug. 23, 1932 |
| 2,114,898 | Dormoy | Apr. 19, 1938 |
| 2,153,434 | Schimkus | Apr. 4, 1939 |
| 2,179,137 | Stevens et al. | Nov. 7, 1939 |
| 2,394,686 | Hammond | Feb. 12, 1946 |

FOREIGN PATENTS

| Number | Country | Date |
|---|---|---|
| 13,214 | Great Britain | June 10, 1902 |
| 345,644 | Great Britain (not accepted) | Sept. 18, 1929 |
| 545,923 | Great Britain | June 18, 1942 |